United States Patent
Inaba et al.

(10) Patent No.: US 10,314,118 B2
(45) Date of Patent: Jun. 4, 2019

(54) INDUCTION HEATING COIL AND INDUCTION HEATING METHOD

(71) Applicant: NETUREN CO., LTD., Tokyo (JP)

(72) Inventors: Hirokazu Inaba, Tokyo (JP); Yutaka Kiyosawa, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 316 days.

(21) Appl. No.: 15/102,381

(22) PCT Filed: Dec. 17, 2014

(86) PCT No.: PCT/JP2014/084202
§ 371 (c)(1),
(2) Date: Jun. 7, 2016

(87) PCT Pub. No.: WO2015/093621
PCT Pub. Date: Jun. 25, 2015

(65) Prior Publication Data
US 2016/0316523 A1    Oct. 27, 2016

Related U.S. Application Data (63) Continuation of application No. PCT/JP2014/084202, filed on Dec. 17, 2014.

(30) Foreign Application Priority Data

Dec. 19, 2013  (JP) .................................. 2013-263118
Dec. 19, 2013  (JP) .................................. 2013-263119

(51) Int. Cl.
*H05B 6/36*    (2006.01)
*H05B 6/10*    (2006.01)
(Continued)

(52) U.S. Cl.
CPC ................. *H05B 6/38* (2013.01); *C21D 1/10* (2013.01); *C21D 1/42* (2013.01); *C21D 9/08* (2013.01); *H05B 6/101* (2013.01); *Y02P 10/253* (2015.11)

(58) Field of Classification Search
CPC . H05B 6/101; H05B 6/36; H05B 6/38; H05B 6/40; C21D 9/0068; C21D 9/08;
(Continued)

(56) References Cited

U.S. PATENT DOCUMENTS 2,549,930 A * 4/1951 Riegel .................... H05B 6/40
                                              219/635
3,236,993 A * 2/1966 Jones ...................... C21D 9/32
                                              219/674
(Continued)

FOREIGN PATENT DOCUMENTS

CH    476 543       8/1969
CN    101787426     7/2010
(Continued)

OTHER PUBLICATIONS

International Search Report dated Jun. 17, 2015 in International Application No. PCT/JP2014/084202.
(Continued)

*Primary Examiner* — Hung D Nguyen
(74) *Attorney, Agent, or Firm* — Wenderoth, Lind & Ponack, L.L.P.

(57) ABSTRACT

To heat a workpiece having a recess portion provided along a longitudinal axis of the workpiece, the workpiece is inserted into an induction heating coil, and the induction heating coil or the workpiece is along an axial direction of the workpiece. The induction heating coil has a conductor configured to surround the workpiece around the axis of the
(Continued)

workpiece. The conductor has a protruding portion protruding inwardly to face the recess portion of the workpiece.

13 Claims, 6 Drawing Sheets

(51) Int. Cl.
*H05B 6/38* (2006.01)
*C21D 9/08* (2006.01)
*C21D 1/10* (2006.01)
*C21D 1/42* (2006.01)

(58) Field of Classification Search
CPC ... C21D 9/28; C21D 9/32; C21D 1/10; C21D 1/18; C21D 1/42; C21D 1/56; C21D 1/613; C21D 1/62; Y02P 10/253
USPC ....... 219/635, 637, 639, 640, 641, 642, 643, 219/645, 646, 653, 674
See application file for complete search history.

(56) References Cited

U.S. PATENT DOCUMENTS

| | | |
|---|---|---|
| 4,394,194 A | 7/1983 | Satava et al. |
| 2005/0006828 A1 | 1/2005 | Streubel et al. |
| 2007/0000916 A1 | 1/2007 | Tanaka et al. |

FOREIGN PATENT DOCUMENTS

| | | |
|---|---|---|
| EP | 1 702 993 | 9/2006 |
| JP | 10-302956 | 11/1998 |
| JP | 2913615 | 6/1999 |
| JP | 2000-87135 | 3/2000 |
| JP | 2000-87135 A * | 3/2000 |
| JP | 2000-195654 | 7/2000 |
| JP | 3117008 | 12/2000 |
| JP | 2002-47515 | 2/2002 |

OTHER PUBLICATIONS

Written Opinion of the International Searching Authority dated Jun. 17, 2016 in International Application No. PCT/JP2014/084202.

* cited by examiner

INDUCTION HEATING COIL AND INDUCTION HEATING METHOD

TECHNICAL FIELD

The present invention relates to an induction heating coil and an induction heating method for inductively heat a workpiece having a recess portion provided along a longitudinal axis of the workpiece.

BACKGROUND ART

According to a related art, for a surface quenching of a cylindrical workpiece, an outer peripheral surface of the workpiece is heated by an induction heating coil (see, e.g., JP2913615B and JP3117008B). The induction heating coil has a fixed coil and a movable coil, and by moving the movable coil in an axial direction of the workpiece, an axial heating range can be adjusted in accordance with the length of the entire workpiece.

According to the induction heating coil described above, the surface of the cylindrical workpiece can be heated along a designated axial length. However, when the workpiece has a cross section that varies along the axial direction, e.g., when a hollow pipe member is partially or entirely depressed inwardly such that a outwardly opened recess portion is provided along a longitudinal axis, this induction heating coil cannot be used.

SUMMARY OF INVENTION

It is an object of the present invention to provide an induction heating coil and an induction heating method for inductively heating a workpiece having a recess portion provided along a longitudinal axis of the workpiece.

According to an aspect of the present invention, an induction heating coil is configured to heat a workpiece having a recess portion provided along a longitudinal axis thereof. The induction heating coil has a conductor configured to surround the workpiece around the axis of the workpiece. The conductor has a protruding portion protruding inwardly to face the recess portion of the workpiece. The conductor may have a first conductor having surrounding portions configured to surround the workpiece around the axis of the workpiece, the surrounding portions being arranged coaxially with a space provided therebetween and coupled to each other, and a second conductor having the protruding portion and arranged between the surrounding portions such that electric current flowing in the surrounding portions causes induced electric current to flow in the second conductor.

According to another aspect of the present invention, an induction heating method includes, when heating a workpiece having a recess portion provided along a longitudinal axis thereof, inserting the workpiece into the induction heating coil described above, and moving one of the induction heating coil and the workpiece along the axial direction of the workpiece.

According to the induction heating coil described above, the conductor is configured to surround the workpiece around the axis of the workpieced, and the protruding portion of the conductor is protrudes inwardly to face the recess portion of the workpiece. Therefore, it is possible to inductively heat the workpiece having the recess portion provided along the longitudinal axis thereof, i.e., to heat the workpiece including the recess portion of the workpiece.

According to the induction heating method described above, the workpiece is inserted into the induction heating coil, and the induction heating coil and the workpiece are relatively moved in the axial direction of the workpiece. Accordingly, by applying electric current to the induction coil while the induction heating coil overlaps a heating target region of the workpiece, it is possible to generate the induced current in the recess portion and backside portion of the workpiece.

BRIEF DESCRIPTION OF DRAWINGS

FIG. 3B is a sectional view taken along a line X-X of FIG. 3A.

FIG. 3C is a sectional view according to another example having a different cross section, and.

DESCRIPTION OF EMBODIMENTS

Hereinafter, embodiments of the present invention will be described in detail with reference to the drawings.

Figure 1:
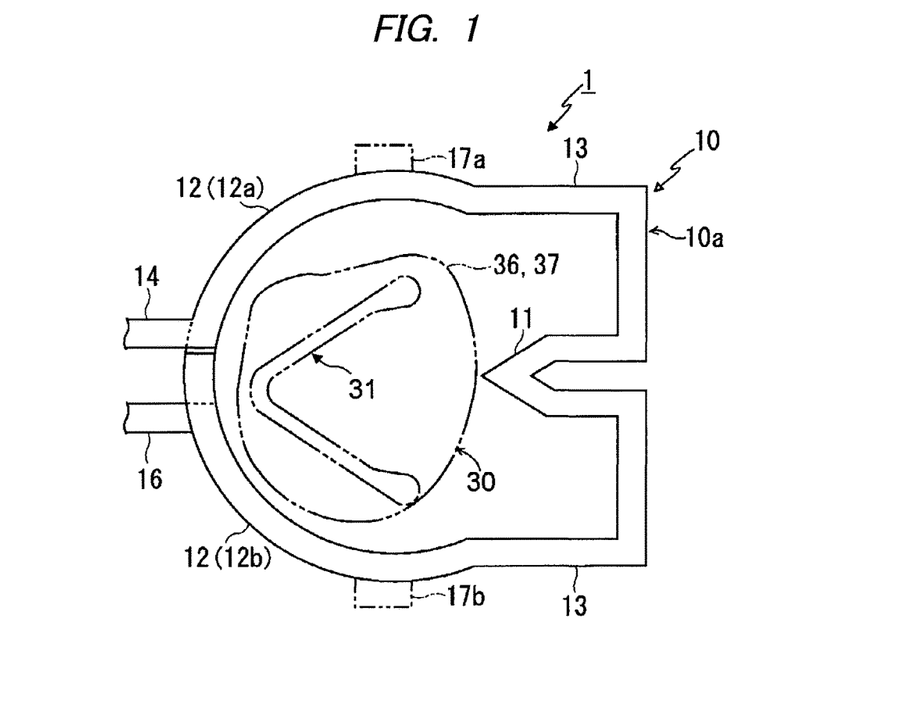
FIG. 1 is a plan view of an induction heating coil according to an embodiment of the present invention.
Figure 2:
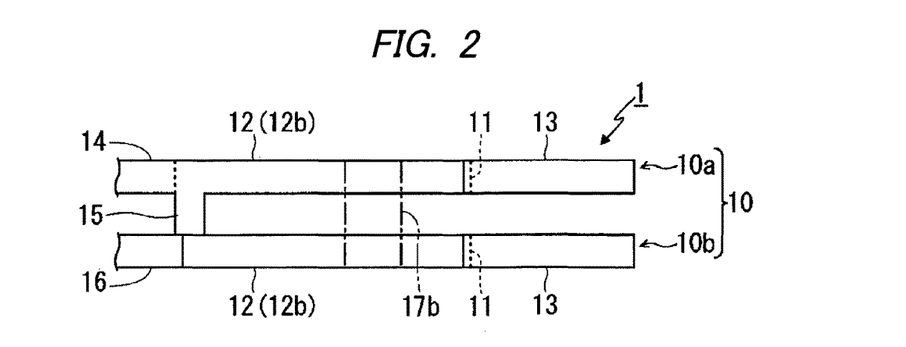
FIG. 2 is a front view of the induction heating coil shown in FIG. 1.

FIG. 1 is a plan view of an induction heating coil 1 according to an embodiment of the present invention, and FIG. 2 is a front view of the induction heating coil 1 shown in FIG. 1. The induction heating coil 1 is used to inductively heat a workpiece 30 having a recess portion 31 provided along a longitudinal axis thereof.

The induction heating coil 1 has a conductor 10 configured to surround the workpiece 30 around an axis of the workpiece 30, and the conductor 10 has a protruding portion 11 protruding inwardly to face the recess portion 31 of the workpiece 30. In this way, it is possible to place the protruding portion 11 in the recess portion 31 of the workpiece 30 and to enable the protruding portion 11 to face the recess portion 31, so that it is possible to easily cause an induction current to flow through the recess portion 31 of the workpiece 30.

As shown with the dashed-two dotted line in FIG. 1, the conductor 10 of the induction heating coil 1 has a size that allows the conductor 10 to surround the workpiece 30 even when the protruding portion 11 is not placed in the recess portion 31 of the workpiece 30. Therefore, even when a depth of the recess portion 31 varies along an axial direction of the workpiece 30, and even when the recess portion 31 is partially not formed, it is possible to enable the workpiece 30 to pass through the induction heating coil 1 over the entire axial length of the workpiece 30. For example, as will be described later with reference to FIG. 3A, even when inductively heating the workpiece 30 having no recess portion 31 formed at both end portions of the workpiece 30, it is possible to insert the protruding portion 11 into the recess portion 31 and to take out the protruding portion 11 from the recess portion 31 while the conductor 10 of the induction heating coil 1 surrounds the workpiece 30.

Figure 3A:
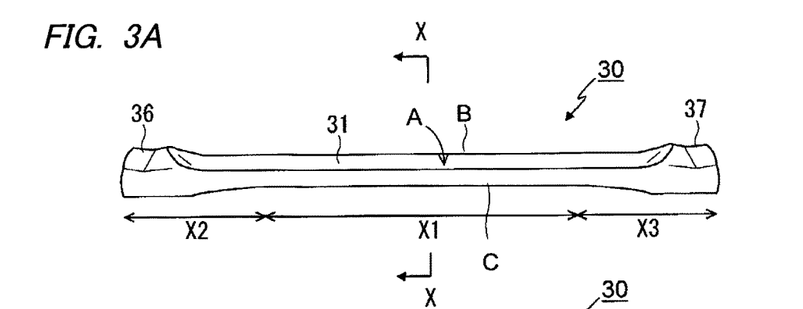
FIG. 3A is a perspective view of a workpiece to be heated by an induction heating coil according to an embodiment of the present invention.
Figures 3B, 3C:
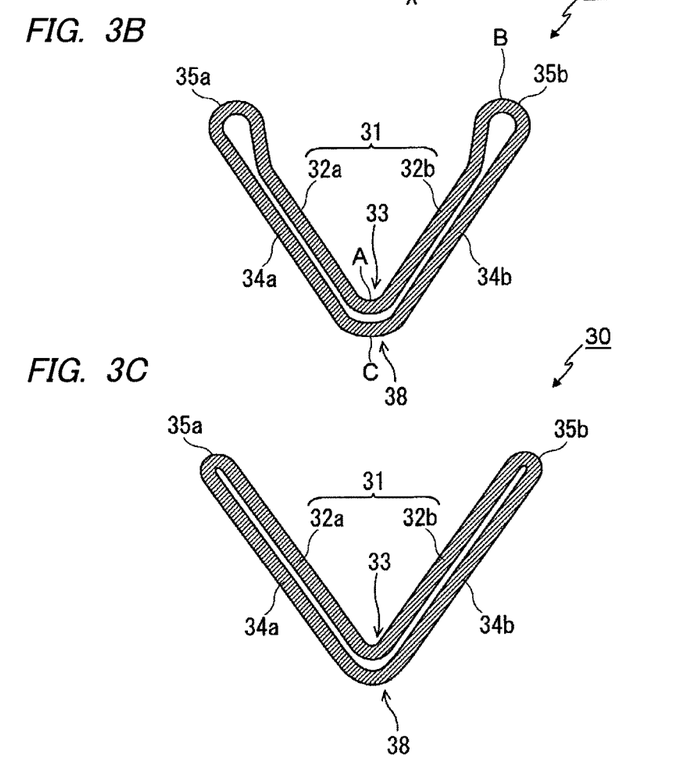

Before describing the induction heating coil 1 shown in FIGS. 1 and 2 in detail, an example of the workpiece 30 to be heated by the induction heating coil 1 will be described. FIG. 3A is a perspective view of the workpiece 30, FIG. 3B is a sectional view taken along the line X-X, and FIG. 3C is a sectional view of another example having a different cross section.

As shown in FIG. 3A, the workpiece 30 is made from, for example. a hollow pipe or a solid bar having a circular, elliptical or polygonal cross section, and has a recess portion or a concave portion (in the present application, collectively referred to as a recess portion) formed along an axial direction, i.e., along a longitudinal direction. A section X1 other than both end portions of an area in which the recess portion 31 is formed is set as a heating target region. One end portion 36 of the workpiece 30 and the other end portion 37 thereof are not formed with the recess portion.

The recess portion 31 of the workpiece 30 will be described in detail. The workpiece 30 has the recess portion 31 along the longitudinal direction. The recess portion 31 is formed in a bet manner such that inner side portions 32a, 32b form an acute angle to form a recess bottom 33. An outer side portion 34a is arranged along the inner side portion 32a, and the other outer side portion 34b is arranged along the inner side portion 32b. The inner side portion 32a and the outer side portion 34a are connected to each other to form an opening edge portion 35a, and the inner side portion 32b and the outer side portion 34b are connected to each other to form the other opening edge portion 35b. The workpiece 30 can be fabricated by press-forming a blank hollow pipe so that a portion of a peripheral wall of the hollow pipe is depressed towards an inside of the hollow pipe except for both end portions of the hollow pipe. As shown in FIG. 3B, the opening edge portions 35a, 35b of the workpiece 30 are different from those shown in FIG. 3C, in that they are somewhat bulged. Except for this, the shapes of the workpieces 30 shown in FIGS. 3B and 3C are substantially the same. In the embodiment of the present invention, the opening edge portions 35a, 35b may have the bulged portions, as shown in FIG. 3B, or may be curved without the bulged portions, as shown in FIG. 3C. Also, the embodiment of the present invention can be applied to any workpiece as long as the workpiece has the recess portion 31 provided along the longitudinal axis.

FIGS. 1 and 2 illustrate an example where the configuration thereof is applied to a coil for inductively heating the workpiece 30 shown in FIG. 3. The specific configuration is described below. The induction heating coil 1 has the conductor 10 arranged so that the workpiece 30 is inserted therethrough and lead portions 14, 16 attached to the conductor 10. The conductor 10 has the protruding portion 11 arranged to face an opening of the recess portion 31 of the workpiece 30 and having a shape corresponding to the cross-sectional shape of the recess portion 31 of the workpiece 30, a pair of curved portions 12 arranged on a side where the recess portion 31 of the workpiece 30 is not opened and having a size that is greater than an outer size of the lateral cross sectional of the workpiece 30, and connecting portions 13 connecting one end of the curved portion 12 and one end of the protruding portion 11 to each other and also connecting the other end of the curved portion 12 and the other end of the protruding portion 11 to each other. The protruding portion 11, the curved portions 12 and the connecting portions 13 may be separately provided and joined together, or may be configured as a one-piece structure.

The protruding portion 11 has an inwardly protruding part arranged to face the opening of the recess portion 31 of the workpiece 30. For example, when the recess portion 31 has a V-shaped cross section, as seen in the longitudinal direction, the protruding portion 11 has a V-shape, as seen in the longitudinal direction. The curved portions 12 are arranged on a side where the recess portion 31 of the workpiece 30 is not opened, i.e., on the opposite side of the opening of the recess portion 31. Each curved portion 12 has a circular arc shape, in the example shown in FIGS. 1 and 2, and each of the curved portions 12a, 12b is positioned on the same plane and has an obtuse central angle. The connecting portions 13 extend straightly in the opening direction of the recess portion 31 from the ends of the curved portions 12a, 12b, and are bent twice to surround an opening-side edge portion of the recess portion 31 of the workpiece 30. For example, when the opening of the recess portion 31 faces leftwards, the connecting portions are bent sequentially by 90° in a clockwise direction, as seen in the longitudinal direction of the workpiece 30, and are then coupled to the ends of the protruding portion 11.

The conductor 10 is preferably configured such that respective surrounding portions 10a, 10b are coaxially arranged with a space being provided in the longitudinal direction, i.e., in the axial direction of the workpiece 30, and such that the surrounding portions 10a, 10b are coupled in series. In the shown example, the lead portion 14 is coupled to one end of the surrounding portion 10a at an opposite side to the opening of the recess portion 31, and a connecting portion 15 extends vertically from the other end of the one surrounding portion 10a and is coupled to one end of the other surrounding portion 10b, and the lead portion 16 is coupled to the other end of the other surrounding portion 10b at an opposite side to the opening of the recess portion 31. In this way, the one surrounding portion 10a and the other surrounding portion 10b are coupled in series, so that the conductor 10 is configured with the forward winding. The lead portions 14, 16 are coupled to a high frequency power supply via a matching box.

The reason why it is desirable to couple the two surrounding portions 10a, 10b of the conductor 10 in series with the forward winding will be described. Both ends of the surrounding portion 10a are made to be close to each other, and both ends of the other surrounding portion 10b are made to be close to each other. That is, the surrounding portions 10a, 10b are not necessarily made to have a perfect annular shape. In order not to rotate the workpiece 30 inserted to the surrounding portions 10a, 10b, the respective ends of the respective surrounding portions 10a, 10b are made to be close to each other but with a gap therebetween. Since the high frequency current does not flow in the gap, there is a region where magnetic field is not generated around an axis. For this reason, the surrounding portions 10a, 10b are configured in the two-stage structure, instead of one stage. The current is caused to flow in a direction of the forward winding. Therefore, it is possible to generate an induced magnetic field as uniform as possible around the axis of the workpiece 30 from the surrounding portions 10a, 10b without rotating the workpiece 30 around the axis.

Non-conductive support portions 17a, 17b are arranged to vertically extend and are fixed to the respective surrounding portions 10a, 10b. Thereby, it is possible to horizontally keep the surrounding portions 10a, 10b with a constant gap.

The conductor 10 is formed by connecting hollow conductive members having respective shapes by brazing and the like. Thereby, it is possible to introduce a coolant from an outside, to supply the coolant into the hollow conductive members and to cool the same, and to discharge the coolant to the outside. Although it is not shown that the conductor 10 has a coolant introducing port and a coolant discharge port, the coolant introducing port and the coolant discharge port are provided at, for example, the lead portions 14, 16.

In the example shown in FIGS. 1 and 2, the curved portions 12 are curved to have a radius greater than a radius of a cross section of the workpiece 30 and are coupled to the protruding portion 11 via the connecting portions 13. Therefore, even when the cross section of the workpiece 30 has such a shape that both end portions 36, 37 of the workpiece 30 have a flat cylindrical shape to some extent and an intermediate section except for both end portions 36, 37 has the V-shaped recess portion 31, as shown with the dashed-two dotted line in FIG. 1, it is possible to insert the workpiece 30 into the conductor 10 ranging from one end portion 36 to the other end portion 37.

As shown in FIG. 3, an induction heating method according to the embodiment of the present invention is used to heat the workpiece 30 having the recess portion 31 provided along the longitudinal axis thereof. The workpiece 30 is inserted into the induction heating coil 1 and one of the induction heating coil 1 and the workpiece 30 is moved in the axial direction. Accordingly, by applying electric current to the induction heating coil 1 while the induction heating coil 1 overlaps a heating target region of the workpiece 30, it is possible to generate the induced current in the recess portion 31 and the backside portion 38 of the workpiece 30.

It is preferable to relatively move any one of the induction heating coil 1 and the workpiece 30 such that the gap between the protruding portion 11 of the induction heating coil 1 and the recess portion 31 of the workpiece 30 is within a given range. Thereby, it is possible to effectively generate the induced current not only in the backside part 38 of the workpiece 30 but also in the recess portion 31, so that it is possible to uniformly heat the workpiece 30 to, for example, a transformation point temperature or higher.

Specifically, the induction heating coil 1 is attached with a moving mechanism (not shown), and the moving mechanism is configured to move the induction heating coil 1 in a horizontal biaxial direction. Therefore, it is possible to horizontally move the conductor 10 so that the protruding portion 11 can freely come in and out of the recess portion 31 of the workpiece 30. In a state in which each of the end portions 36, 37 of the workpiece 30 is inserted in the conductor 10, the protruding portion 11 is not placed in the recess portion 31, and in a state in which the intermediate section of the workpiece 30 is inserted in the conductor 10, the protruding portion 11 is placed in the recess portion 31. Thereby, even though a depth of the recess portion 31 of the workpiece 30 is axially changed and even though the recess portion 31 of the workpiece 30 is curved without extending straightly, it is possible to inductively heat the recess portion 31 of the workpiece 30 along the shape of the recess portion 31. If the protruding portion 11 is not placed in the recess portion 31, since the gap between the protruding portion 11 and the recess portion 31 is large, the induced current flows with being dispersed from the protruding portion 11 towards the recess portion 31. Thereby, the great induced current flows through the opposite side to the recess portion 31 of the workpiece 30, i.e., the backside-side of the lead portions 14, 16. As a result, an end face heating state where only the backside of the workpiece 30 is partially heated is made. In contrast, according to the embodiment of the present invention, the protruding portion 11 is placed in the recess portion 31, and the gap between the protruding portion 11 and the recess portion 31 is preferably adjusted to be within the given range in accordance with the depth of the recess portion 31, so that the induced current flows without being dispersed from the protruding portion 11 towards the recess portion 31 of the workpiece 30 and the induced current is caused to flow in an annular shape through the recess portion 31 of the workpiece 30 and the backside portion 38 of the workpiece 30. Thereby, it is possible to enable the current to uniformly flow in a circumferential direction of the cross section of the workpiece 30 and to uniformly heat the workpiece 30 by adjusting the magnitude of the high frequency current.

In the following, an example where the workpiece having the recess portion 31 formed at the intermediate section except for both end portions 32, 33 of the workpiece 30 along the longitudinal direction is inductively heated, as shown in FIGS. 3A and 3B, is described. A method of inductively heating a section X1 of the recess portion 31 of the workpiece 30 shown in FIG. 3 by using the induction heating coil 1 shown in FIGS. 1 and 2 is described. FIGS. 4A to 4D illustrate a process of inductively heating the workpiece 30 by using the induction heating coil 1 shown in FIG. 1. As sequentially shown in FIGS. 4A to 4D, in order to heat the recess portion 31 of the workpiece, the protruding portion 11 of the induction heating coil 1 is inserted to a heating starting point S in the recess portion 31 of the workpiece 30 and the protruding portion 11 of the induction heating coil 1 is slid to a heating ending point F in the recess portion 31 of the workpiece 30 along the recess portion 31. At the heating ending point F, the protruding portion 11 is taken out from the recess portion 31 of the workpiece, so that the heating for the predetermined part of the recess portion 31 is over. At this time, any of the workpiece 30 and the induction heating coil 1 may be moved.

Figure 4A:
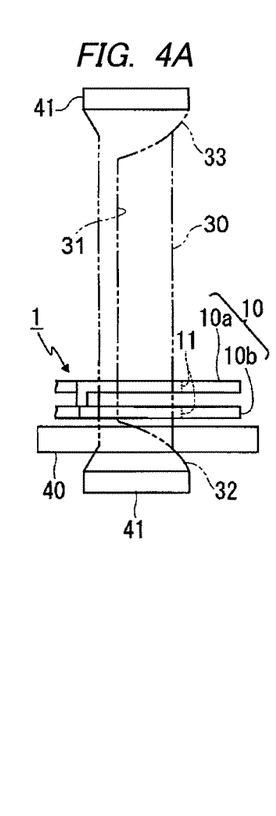
FIGS. 4A to 4D illustrate a process of inductively heating the workpiece by using the induction heating coil shown in FIG. 1.

Specifically, the induction heating coil 1 is horizontally arranged so that the central axis of the induction heating coil 1 is disposed in the vertical direction, and the workpiece 30 is then inserted into the conductor 10. For example, as shown in FIG. 4, a hollow jacket 40 for injecting a quenching liquid is arranged below the conductor 10, and the two-stage surrounding portions 10a, 10b are coaxially arranged above the jacket 40. At this state, the other end portion 32 of the workpiece 30 is coaxially inserted into the two-stage surrounding portions 10a, 10b. In the meantime, the one and other end portions 32, 33 of the workpiece 30 are attached with chuck mechanisms 41, 41, respectively, and the chuck mechanisms 41, 41 are vertically moved by the moving mechanism (not shown).

Figure 4B:
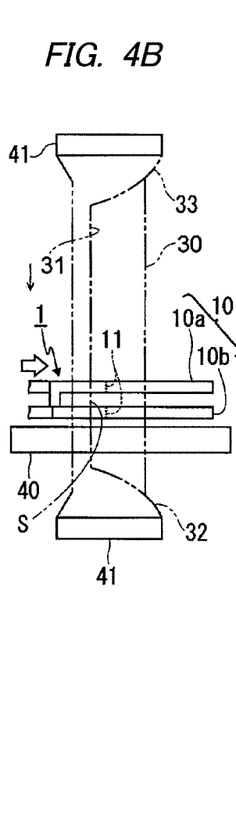

Subsequently, as shown in FIG. 4A, the workpiece 30 is moved vertically downwards without inserting the protruding portion 11 into the recess portion 31 of the workpiece 30. When the one end of the recess portion 31 of the workpiece 30 passes through the lower surrounding portion 10b, the protruding portion 11 is placed in the recess portion 31 of the workpiece 30. This becomes the heating starting point S of the recess portion 31 and is shown in FIG. 4B.

The high frequency current is caused to flow through the induction heating coil 1 at the same time as or before or after the conductor 10 is relatively moved by the moving mechanism (not shown) and the protruding portion 11 is thus placed in the recess portion 31. Thereby, the part of the workpiece 30 inserted into and overlapping with the surrounding portions 10a, 10b of the induction heating coil 1 is inductively heated by the conductor 10.

Figure 4C:
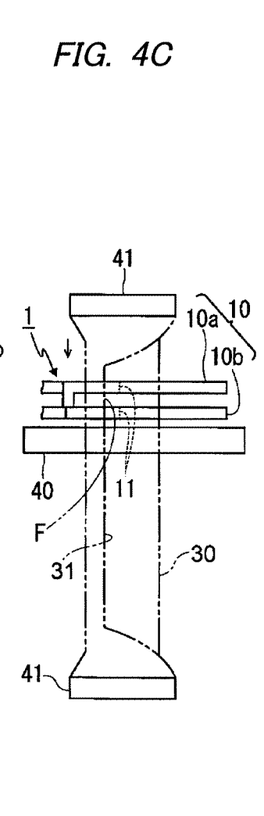

The upper and lower chuck mechanisms 41, 41 are moved downwards, so that the workpiece 30 descends along the longitudinal direction. Thereby, the heating target region of the workpiece 30 is shifted from a lower end of the intermediate section X1 toward an upper end.

Figure 4D:
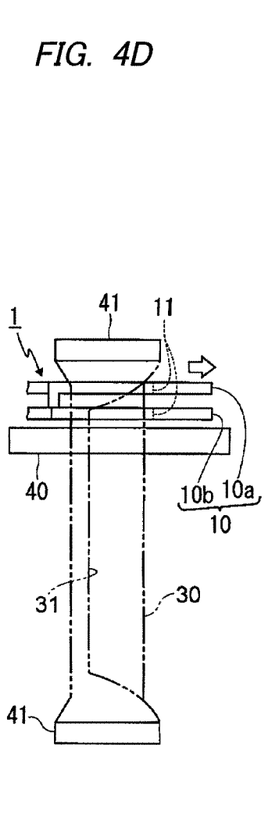

Also, the protruding portion 11 is taken out from the recess portion 31 of the workpiece 30 by moving the conductor 10 before the upper end of the recess portion 31 of the workpiece 30 passes through the upper surrounding portion 10a, i.e., at the heating ending point F of the recess portion 31. Upon the takeout or before or after the takeout, the current supply to the induction heating coil 1 is stopped.

By the above process, for example, only the X1 section (see FIG. 3) of the recess portion 31 of the workpiece 30 can be quenched. Also, by adjusting the current applying time to be only part of the time during which the protruding portion 11 is placed in the recess portion 31, it is possible to partially heat the workpiece, not the entire length of the recess portion 31 and the backside portion 38 of the workpiece 30.

The chuck mechanism may not necessarily be moved downwards to lower the workpiece 30. For example, the chuck mechanism may be moved upwards to raise the workpiece 30, or the chuck mechanisms may be moved along the longitudinal direction of the workpiece 30.

Figure 5:
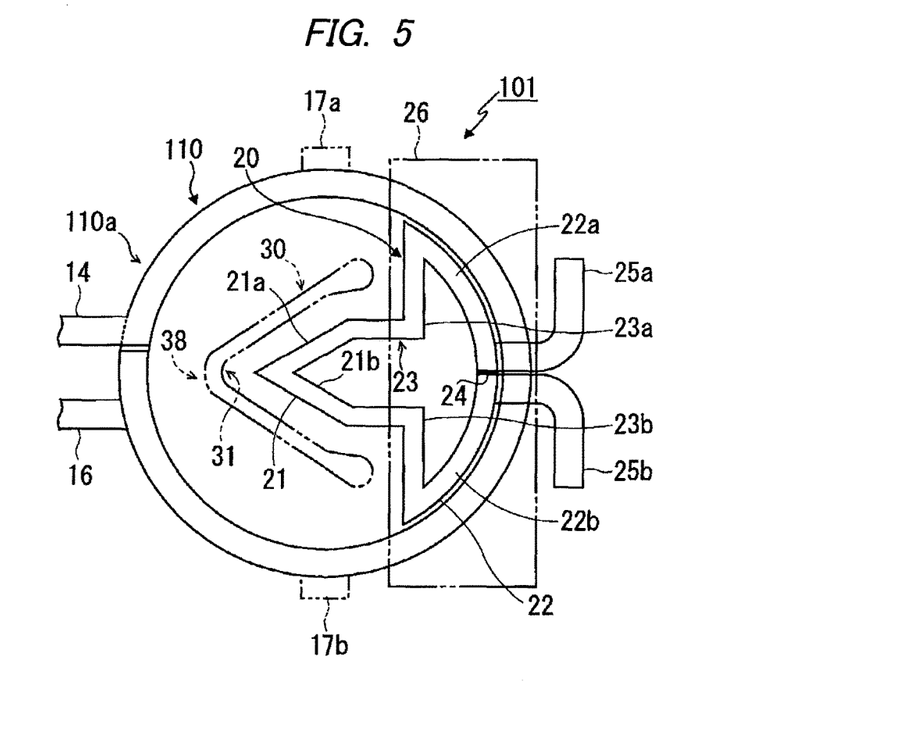
FIG. 5 is a plan view of an induction heating coil according to another embodiment of the present invention.
Figure 6:
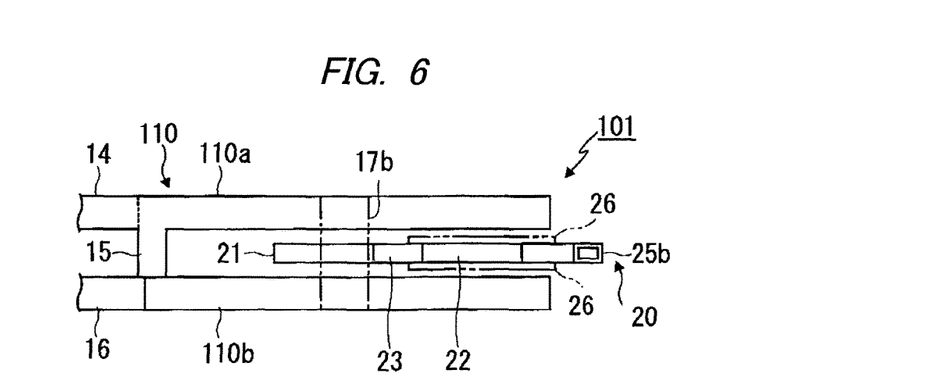
FIG. 6 is a front view of the induction heating coil shown in FIG. 5.

An induction heating coil shown in FIGS. 5 and 6 is adapted to inductively heat the workpiece 30 shown in FIG. 3, and a specific configuration thereof will be described. A first conductor 110 is preferably configured so that two-stage surrounding portions 110a, 110b are coaxially arranged with a space provided therebetween, and the surrounding portions 110a, 110b are coupled in series or in parallel. Both ends of the one surrounding portion 110a are made to be close to each other, and both ends of the other surrounding portion 110b are made to be close to each other. The lead portion 14 is coupled to one end of the one surrounding portion 110a, the connecting portion 15 vertically extends to the other end of the one surrounding portion 110a and is coupled to one end of the other surrounding portion 110b, and the lead portion 16 is coupled to the other end of the other surrounding portion 110b. Thereby, the surrounding portions 110a, 110b are coupled in series. The lead portions 14, 16 are coupled to a high frequency power supply via a matching box.

A second conductor 20 is arranged in a gap between the surrounding portions 110a, 110b of the first conductor 110, a moving mechanism (not shown) is coupled to the second conductor 20 so that a portion of the second conductor 20 is enabled to come in and out of the recess portion 31 of the workpiece 30 by the moving mechanism. Thereby, when the high frequency current is caused to flow in the two-stage surrounding portions 110a, 110b, an induced magnetic field is generated in the second conductor 20 and thus induced electric current is caused to flow in the second conductor 20, so that the induced magnetic field is generated in the recess portion 31 and around that.

The second conductor 20 is arranged to face the opening of the recess portion 31, and has a protruding portion 21 having a shape corresponding to the cross sectional shape of the recess portion 31 of the workpiece 30, a curved portion 22 partially arranged along the surrounding portions 110a, 110b of the first conductor 110 and a connecting portion 23 connecting the protruding portion 21 and the curved portion 22 to each other. The protruding portion 21, the curved portion 22 and the connecting portion 23 are separate parts and are joined together. However, they may be configured as a one-piece structure. The protruding portion 21 of the second conductor 20 has the shape corresponding to the cross sectional shape of the recess portion 31 of the workpiece 30, so that when the protruding portion 21 is placed in the recess portion 31 of the workpiece 30, it is possible to effectively generate the induced magnetic field in the recess portion 31 of the workpiece 30 and in the vicinity thereof.

As shown in FIG. 5, when the recess portion 31 of the workpiece 30 has a V-shaped cross sectional shape, the protruding portion 21 is configured by a V-shaped hollow conductor along the recess portion 31 of the workpiece 30. That is, the protruding portion 21 is formed by coupling one protrusion 21a extending straightly along the inner side portion 32a of the recess portion 31 of the workpiece 30 and the other protrusion 21b extending straightly along the inner side portion 32b of the workpiece 30 at an acute angle, so that it has a V shape in a plan view. When the recess portion 31 has a U shape, the protruding portion 21 is configured by a U-shaped hollow conductor.

The curved portion 22 has a curvature that is greater than the two-stage surrounding portions 110a, 110b of the first conductor 110. In a state in which the protruding portion 21 of the second conductor 20 is placed in the recess portion 31, the curved portion 22 is arranged at an inner side (a central side) of the surrounding portions 110a, 110b so that it does not overlap the surrounding portions 110a, 110b in a plane view. Thereby, the induced current is enabled to effectively flow from the first conductor 110 towards the second conductor 20.

The connecting portion 23 is coupled to an end of the one protrusion 21a and an end of the other protrusion 21b. Therefore, the connecting portion 23 has a pair of connecting portions 23a, 23b, each having an L shape in a plan view. The curved portion 22 is coupled to ends of the pair of connecting portions 23a, 23b. In a state in which the second conductor 20 is placed in the recess portion 31, the curved portion 22 of the second conductor 20 has substantially the same central angle as an angle of the recess portion 31 of the workpiece 30. Also, a circular arc part of the second conductor is arranged along the surrounding portions of the first conductor, so that it is possible to effectively generate the induced current from the surrounding portions of the first conductor towards the circular arc part of the second conductor.

The reason why it is preferable to connect the surrounding portions 110a, 110b of the first conductor 110 in series will be described. Both ends of the one surrounding portion 110a are made to be close to each other, and both ends of the other surrounding portion 110b are made to be close to each other. That is, the surrounding portions 110a, 110b are not necessarily made to have a circular shape. The respective ends of the respective surrounding portions 110a, 110b are made to be close to each other but are made to have a gap therebetween. Since the high frequency current does not flow in the gap, there is region where a magnetic field is not generated around an axis. Also, according to the embodiment of the present invention, the workpiece 30 is not rotated. Therefore, the first conductor 110 is preferably configured with the two-stage surrounding portions 110a, 110b, not one stage, so that the current flows in a direction of the forward winding. It is possible to generate the induced magnetic field as uniform as possible around the axis of the workpiece 30 from the surrounding portions 110a, 110b without rotating the workpiece 30 around the axis.

An insulating sheet (not shown) may be interposed between the surrounding portions 110a, 110b of the first conductor 110 and the second conductor 20, particularly between the respective surrounding portions 110a, 110b and the curved portion 22. Alternatively, an insulating sheet material 26 may be fixed to a part at which the first conductor 110 and the second conductor 20 can face each other, for example, surfaces of the curved portion 22 facing the surrounding portions 110a, 110b. Thereby, it is possible to prevent sparks from being generated between the first conductor 110 and the second conductor 20.

The non-conductive support portions 17a, 17b are arranged to vertically extend with respect to the first conductor 110 and are fixed to the respective surrounding portions 110a, 110b. Thereby, it is possible to horizontally keep the surrounding portions 110a, 110b with a constant gap.

Both the first conductor 110 and the second conductor 20 are formed by connecting hollow conductive members having respective shape by brazing and the like. Thereby, it is possible to introduce a coolant from an outside, to supply the coolant into the hollow conductive member and to cool the same, and to discharge the coolant to the outside. Although it is not shown that the conductor 110 has a coolant introducing port and a coolant discharge port, the coolant introducing port and the coolant discharge port are provided at, for example the lead portions 14, 16.

The second conductor 20 is provided at a middle of the curved portion 22 with a partition member 24, preferably, a conductive partition member 24. Both curved portions 22a, 22b are respectively attached with piping connecting portions 25a, 25b facing towards the outside with the partition member 24 being interposed therebetween.

A configuration may also be considered in which the workpiece 30 is arranged along the axes of the surrounding portions 110a, 110b of the first conductor 110 without using the second conductor 20 and the high frequency current is caused to flow from the lead portions 14, 16 to inductively heat the workpiece 30.

However, if the protruding portion 21 is not placed in the recess portion 31, since the gap between the protruding portion 21 and the recess portion 31 of the workpiece 30 is large, the induced current flows with being dispersed from the protruding portion 21 towards the recess portion 31. Thereby, the great induced current flows through the opposite side to the recess portion 31 of the workpiece 30, i.e., the backside part 38-sides of the lead portions 14, 16. As a result, an end face heating state where only the backside part 38-side of the workpiece 30 is partially heated is made.

In contrast, according to the embodiment of the present invention, the protruding portion 21 is placed in the recess portion 31, and the current is caused to flow from the lead portions 14, 16 towards the surrounding portions 110a, 110b in a state in which the curved portion 22 and the surrounding portions 110a, 110b are likely to be electromagnetically coupled. Thereby, the induced current flows through the curved portion 22 and also flows through the protruding portion 21 via the connecting portion 23. In the inner side portions 32a, 32b of the workpiece 30, the induced current flows by an influence of the induced magnetic field by the protrusions 21a, 21b, and in the opening edge portions 35a, 35b of the workpiece 30, the induced current flows by an influence of the induced magnetic field by the connecting portions 23a, 23b. In the outer side portions 34a, 34b, the induced current flows by an influence of the induced magnetic field by a part of the surrounding portion 110a facing towards the lead portions 14, 16, i.e., a part facing the outer side portions 34a, 34b. In this way, the magnetic field generated by the surrounding portions 110a, 110b and the magnetic field generated by the second conductor 20 such as the protruding portion 21 are made to overlap with each other, so that it is possible to increase the temperature, irrespective of the parts of the workpiece 30.

In this way, the protruding portion 21 is placed in the recess portion 31, so that the induced current flows without being dispersed from the protruding portion 21 towards the recess portion 31 of the workpiece 30, the induced current is caused to flow in the annular shape through the recess portion 31 of the inner side portions 32a, 32b and the backside portion 38 of the outer side portions 38a, 38b, the current flows uniformly in the circumferential direction of the cross section of the workpiece 30 and the workpiece 30 can be thus uniformly heated.

As shown in FIG. 3, the induction heating method according to the embodiment of the present invention is used to heat the workpiece 30 having the recess portion 31 provided along the longitudinal axis thereof. The workpiece 30 is inserted into the induction heating coil 101, and one of the induction heating coil 101 and the workpiece 30 is moved in the axial direction. Accordingly, by applying electric current to the induction heating coil 101 while the induction heating coil 101 overlaps a heating target region of the workpiece 30, it is possible to generate the induced current in the recess portion 31 and the backside portion 38 of the workpiece 30.

It is preferable to relatively move any one of the induction heating coil 101 and the workpiece 30 so that the gap between the protruding portion 21 of the induction heating coil 101 and the recess portion 31 of the workpiece 30 is within the given range. Thereby, it is possible to effectively generate the induced current not only in the backside part 38 of the workpiece 30 but also in the recess portion 31, so that it is possible to uniformly heat the workpiece 30 to, for example, the transformation point temperature or higher.

Specifically, the induction heating coil 101 is attached with the moving mechanism (not shown), and the moving mechanism is configured to move the induction heating coil 101 in the horizontal biaxial direction. Therefore, it is possible to horizontally move the second conductor 20 so that the protruding portion 21 can freely come in and out of the recess portion 31 of the workpiece 30. In a state in which the respective end portions 36, 37 of the workpiece 30 are inserted in the first conductor 110, the protruding portion 21 is not placed in the recess portion 31, and in a state in which the intermediate section of the workpiece 30 is inserted in the first conductor 110, the protruding portion 21 is placed in the recess portion 31. Thereby, even though the depth of the recess portion 31 of the workpiece 30 is axially changed and even though the recess portion 31 of the workpiece 30 is curved without extending straightly, it is possible to inductively heat the recess portion 31 of the workpiece 30 along the shape of the recess portion 31.

The protruding portion 21 is placed in the recess portion 31, and the gap between the protruding portion 21 and the recess portion 31 is preferably adjusted to be within the given range in accordance with the depth of the recess portion 31, so that the induced current flows without being dispersed from the protruding portion 21 towards the recess portion 31 of the workpiece 30 and the induced current is caused to flow in the annular shape through the recess portion 31 of the workpiece 30 and the backside portion 38 of the workpiece 30. Thereby, it is possible to enable the current to uniformly flow in the circumferential direction of the cross section of the workpiece 30 and to uniformly heat the workpiece 30 by adjusting the magnitude of the current flowing through the induction heating coil 101.

In the below, an example where the workpiece 30 having the recess portion 31 formed at the intermediate section except for both end portions 36, 37 of the workpiece 30 along the longitudinal direction is inductively heated, as shown in FIG. 3, is described. A method of inductively heating the section X1 of the recess portion 31 of the workpiece 30 shown in FIG. 3 by using the induction heating coil 101 shown in FIGS. 5 and 6 is described. FIG. 7 illustrates a process of inductively heating the workpiece by using the induction heating coil shown in FIG. 5. As sequentially shown in FIGS. 7A to 7D, in order to heat the recess portion 31 of the workpiece, the protruding portion 21 of the second conductor 20 is inserted to the heating starting point S in the recess portion 31 of the workpiece 30 and the second conductor 20 is slid to the heating ending point F in the recess portion 31 of the workpiece 30 along the recess portion 31. At the heating ending point F, the protruding portion 21 of the second conductor 20 is taken out from the recess portion 31 of the workpiece, so that the heating for the predetermined part of the recess portion 31 is over. At this time, any of the workpiece 30 and the induction heating coil 101 may be moved.

Figure 7A:
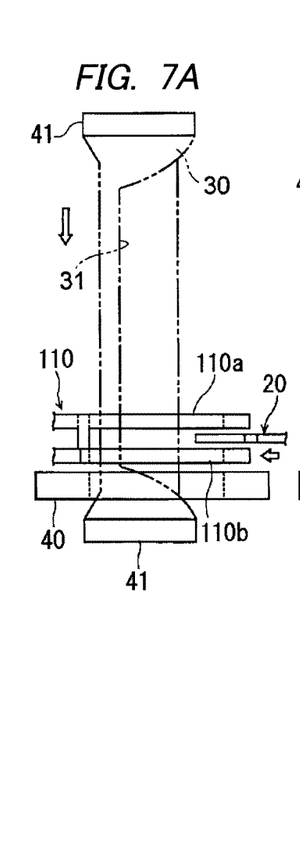
FIGS. 7A to 7D illustrate a process of inductively heating the workpiece by using the induction heating coil shown in FIG. 5.

Specifically, the induction heating coil 101 of the embodiment of the present invention is horizontally arranged so that the central axis of the induction heating coil 101 is disposed in the vertical direction, and one end portion of the workpiece 30 is inserted into the surrounding portions 110a, 110b of the first conductor 110. For example, as shown in FIG. 7A, the hollow jacket 40 for injecting a quenching liquid is arranged below the surrounding portions 110a, 110b of the first conductor 110, and the two-stage surrounding portions 110a, 110b are coaxially arranged above the jacket 40. At this time, the protruding portion 21 of the second conductor 20 is not inserted into the hollow space of the surrounding portions 110a, 110b. At this state, the lower end-side of the workpiece 30 is coaxially inserted into the two-stage surrounding portions 110a, 110b. In the meantime, the upper and lower end portions of the workpiece 30 are attached with the chuck mechanisms 41, 41, respectively, and the chuck mechanisms 41, 41 are vertically moved by the moving mechanism (not shown).

Figure 7B:
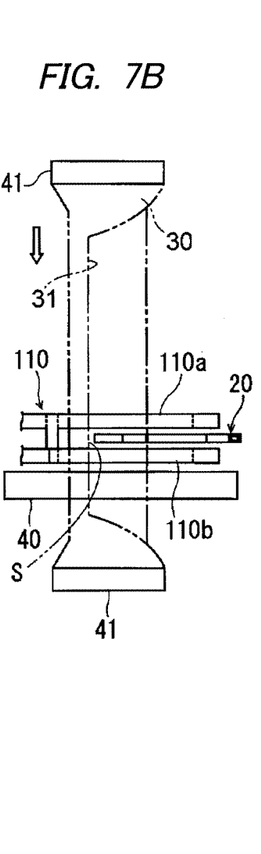

Subsequently, as shown in FIG. 7A, the workpiece 30 is moved longitudinally without inserting the protruding portion 21 of the second conductor 20 in the recess portion 31 of the workpiece 30. When one end of the recess portion 31 of the workpiece 30 passes through the upper surrounding portion 110a of the first conductor 110, the protruding portion 21 of the second conductor 20 is placed in the recess portion 31 of the workpiece 30. This becomes the heating starting point S of the recess portion 31 and is shown in FIG. 7B.

The high frequency current is caused to flow through the first conductor 110 at the same time as or before or after the second conductor 20 is relatively moved by the moving mechanism (not shown) and the protruding portion 21 is thus placed in the recess portion 31. Thereby, the part of the workpiece 30 inserted into and overlapping with the surrounding portions 110a, 110b of the induction heating coil 101 is inductively heated by the first conductor 110 and second conductor 20.

Figure 7C:
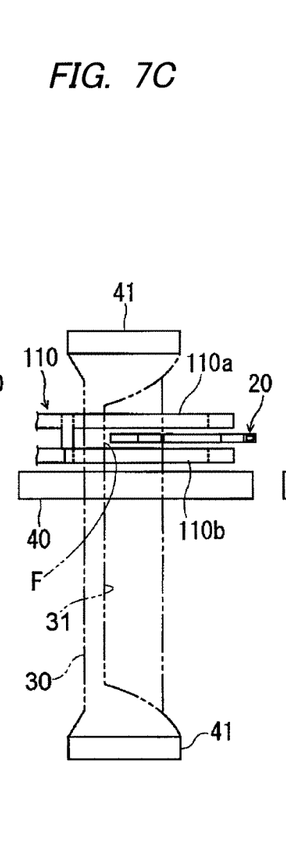

The upper and lower chuck mechanisms 41, 41 are moved downwards by the moving mechanism, so that the workpiece 30 descends along the longitudinal direction. Thereby, the heating target region of the workpiece 30 is shifted from a lower end of the intermediate section toward an upper end.

Figure 7D:
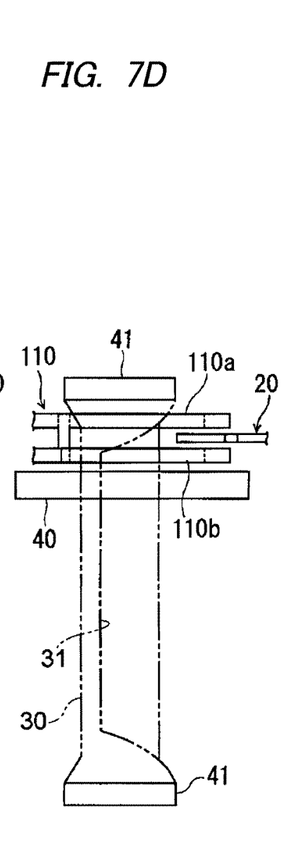

Further, the second conductor 20 is taken out from the recess portion 31 of the workpiece 30 before the upper end of the recess portion 31 of the workpiece 30 passes through the upper surrounding portion 110a of the first conductor 110, i.e., at the heating ending point F of the recess portion 31. Upon the takeout or before or after the takeout, the current supply to the first conductor 110 is stopped.

By the above process, for example, only the X1 section (see FIG. 3) of the recess portion 31 of the workpiece 30 can be quenched. Also, by adjusting the current applying time to be only part of the time during which the protruding portion 21 is placed in the recess portion 31, it is possible to partially heat the workpiece 30, not the entire length of the recess portion 31 and the backside portion 38 of the workpiece 30.

The chuck mechanism may not necessarily be moved downwards to lower the workpiece 30. For example, the chuck mechanism may be moved upwards to raise the workpiece 30, or the chuck mechanism may be moved along the longitudinal direction of the workpiece 30.

Example

As the workpiece 30, the steel material having the V-shaped recess formed except for both end portions thereof has been used, as shown in FIG. 3A. As shown in FIG. 3B, the steel material having the opening edge portions 35a, 35b, which are more bulged than those of FIG. 3C, has been used. The quenching has been performed using the above-described induction heating method in accordance with a following sequence. While the workpiece 30 was moved, after the lower end of the recess portion 31 passed through the other surrounding portion 110b, the protruding portion 21 was placed in the recess portion 31 and the high frequency current was then enabled to flow through the first conductor 110. Then, the current supply was stopped before the upper end of the recess portion 31 passed through the one surrounding portion 110a, and the protruding portion 21 was taken out from the recess portion 31. At this time, thermocouples were disposed at parts indicated by the reference numerals A, B and C in FIG. 3B, and temperatures thereof were measured. The reference numeral A indicates the recess bottom 33, the reference numeral B indicates the opening edge portion 35b and the reference numeral C indicates the backside part 38.

Comparative Example

As a comparative example, the quenching was performed with only the first conductor 110 without using the second conductor 20 of the embodiment.

Figure 8A:
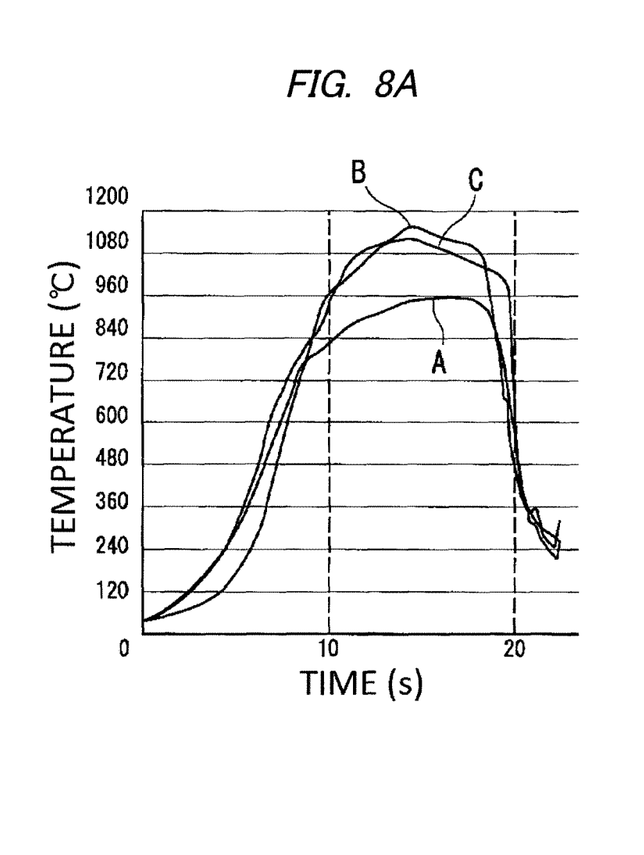
FIG. 8A shows a result according to an example.
Figure 8B:
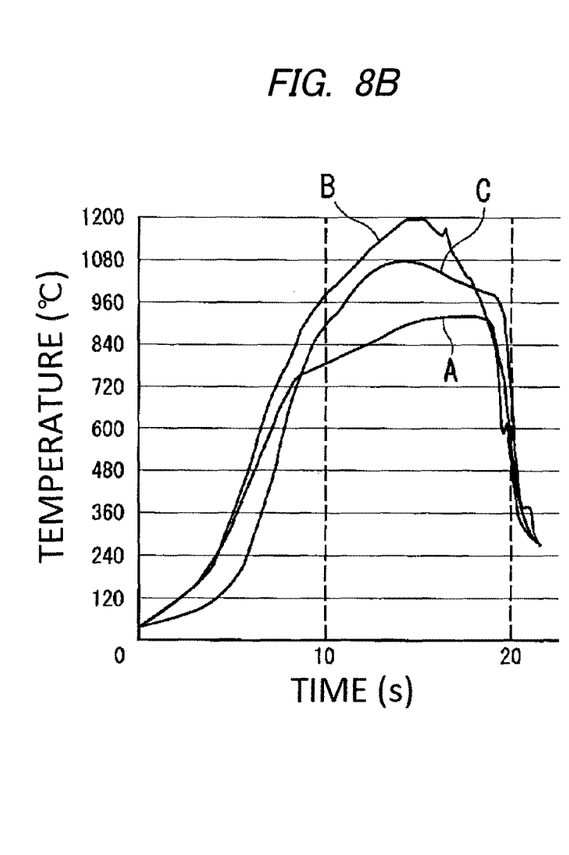
FIG. 8B shows a result according to a comparative example.

FIG. 8A shows a result of the embodiment, and FIG. 8B shows a result of the comparative example. In FIG. 8, a vertical axis indicates a temperature (° C.), and a horizontal axis indicates time. In the embodiment, as shown in FIG. 8A, the parts B and C of the workpiece 30 show substantially the same temperature profiles, and a temperature difference from the part A is about 200° C. On the other hand, in the comparative example, as shown in FIG. 8B, there is a temperature difference between the parts B and C of the workpiece 30. Further, the temperature difference between the parts B and C is about 275° C. Therefore, comparing the embodiment and the comparative example, it could be seen that the temperature difference between the parts B and C was smaller in the configuration where the second conductor 20 is moved to come in and out.

The induction heating coil of the embodiment of the present invention can be appropriately changed in accordance with the above-described embodiment and the shape of the recess portion 31 of the workpiece 30. In the below, the shown reference numerals are together denoted for convenience.

The cross section of the recess portion 31 of the workpiece 30 is not limited to the V-shaped cross section. For example, the recessed portion 31 may have a different recessed shape such as a substantially right-angled shape or a substantially U shape. The protruding portion 11, 21 of the induction heating coil 1, 101 may be configured to conform to the shape of the recessed portion.

Further, when the cross-sectional shape of the recess portion of the workpiece is asymmetrical, the protruding portion 11, 21 may also be asymmetrical in accordance with the shape of the recess portion 31 of the workpiece 30. In this case, it is preferable that a constant gap is provided between the surfaces of the recess portion 31 and the outer peripheral surface of the protruding portions 11, 21.

The shapes of the curved portions 12, 22 are not necessarily the circular arc. That is, any shape configured to annularly surround the workpiece 30 by the connecting portions 13, 23 and the protruding portions 11, 21 may be possible.

The induction heating coil and induction heating method of the embodiment of the present invention are not limited to the workpiece 30 exemplified in FIG. 3. That is, the recess portion 31 may be formed over the entire length of the workpiece 30, and the depth of the recess portion 31 may be changed along the axial direction. In this case, the parts at which the protruding portions 11, 21 of the induction heating coils 1, 101 are placed in the recess portion 31 of the workpiece 30 may be adjusted.

Also, the shape of the workpiece 30 along the axial direction is not necessarily straight. That is, only both end portions may have a curved shape, depending on the utilities of the workpiece 30. In this case, the induction heating coils 1, 101 may be moved by the moving mechanism in at least two directions on a plane of which an axial direction is a normal line.

This application is based on Japanese Patent Application Nos. 2013-263118 and 2013-263119 both filed on Dec. 19, 2013, the entire contents of which are incorporated herein by reference.

The invention claimed is:

1. An induction heating coil configured to heat a workpiece having a recess portion provided along a longitudinal axis of the workpiece, the induction heating coil comprising a conductor configured to surround the workpiece around the axis of the workpiece, wherein the conductor comprises a protruding portion protruding inwardly to face the recess portion of the workpiece,
   wherein the conductor has a size that allows the conductor to surround the workpiece in a state in which the protruding portion is not placed in the recess portion of the workpiece.

2. The induction heating coil according to claim 1, wherein the protruding portion is arranged to face an opening of the recess portion of the workpiece and has a shape corresponding to a cross sectional shape of the recess portion of the workpiece, and
   wherein the conductor comprises a curved portion disposed on a side where the recess portion of the workpiece is not opened and having a size that is greater than a cross sectional size of the workpiece, and connecting portions connecting one end of the curved portion and one end of the protruding portion to each other and connecting another end of the curved portion and another end of the protruding portion to each other.

3. The induction heating coil according to claim 1, wherein the conductor is configured as a pair of conductors between which a space is provided in an axial direction of the workpiece, and wherein the pair of conductors are coupled to each other in series.

4. The induction heating coil according to claim 3, further comprising a pair of non-conductive support members extending in the axial direction and connecting the pair of conductors to each other.

5. The induction heating coil according to claim 3, wherein each of the conductors has ends that face each other with a gap provided between the ends,
   wherein the conductors are coupled to each other in series such that current flows through each of the conductors in a same direction around the axis of the workpiece and such that the conductors are arranged to overlap each other in the axial direction of the workpiece.

6. An induction heating coil configured to heat a workpiece having a recess portion provided along a longitudinal axis of the workpiece, the induction heating coil comprising a conductor configured to surround the workpiece around the axis of the workpiece, wherein the conductor comprises a protruding portion protruding inwardly to face the recess portion of the workpiece, wherein the conductor comprises:
   a first conductor comprising surrounding portions configured to surround the workpiece around the axis of the workpiece, the surrounding portions being arranged coaxially with a space provided between the surrounding portions and being coupled to each other, and
   a second conductor comprising the protruding portion and arranged between the surrounding portions such that electric current flowing in the surrounding portions causes induced electric current to flow in the second conductor,
   wherein the second conductor is moveable relative to the first conductor.

7. The induction heating coil according to claim 6, wherein the protruding portion is arranged to face an opening of the recess portion of the workpiece and has a shape corresponding to a cross sectional shape of the recess portion of the workpiece, and
   wherein the second conductor further comprises a curved portion arranged along the surrounding portions of the first conductor and a connecting portion connecting the protruding portion and the curved portion to each other.

8. The induction heating coil according to claim 7, wherein the curved portion of the second conductor has a greater curvature than the surrounding portions of the first conductor, and
   wherein the curved portion of the second conductor is arranged at an inner side of the surrounding portions of the first conductor in a state in which the protruding portion is placed in the recess portion of the workpiece.

9. An induction heating method for heating a workpiece having a recess portion provided along a longitudinal axis of the workpiece, the method comprising:
   inserting the workpiece into an induction heating coil having a conductor configured to surround the workpiece around the axis of the workpiece, wherein the conductor has a protruding portion protruding inwardly to face the recess portion of the workpiece; and
   moving one of the induction heating coil and the workpiece along an axial direction of the workpiece,
   wherein the conductor has a size that allows the conductor to surround the workpiece in a state in which the protruding portion is not placed in the recess portion of the workpiece.

10. The induction heating method according to claim 9, wherein said one of the induction heating coil and the workpiece is moved such that a gap between the protruding portion and the recess portion of the workpiece is within a given range.

11. The induction heating method according to claim 9, further comprising changing the gap between the protruding portion and the recess portion of the workpiece in accordance with a depth of the recess portion of the workpiece.

12. The induction heating method according to claim 9, further comprising:
   inserting the protruding portion into the recess portion at a heating starting point on the recess portion of the workpiece; and
   taking the protruding portion out from the recess portion at a heating ending point on the recess portion of the workpiece,
   wherein the conductor is moved relative to the workpiece to the heating ending point.

13. An induction heating method for heating a workpiece having a recess portion provided along a longitudinal axis of the workpiece, the method comprising:
   inserting the workpiece into an induction heating coil having a conductor configured to surround the workpiece around the axis of the workpiece, wherein the conductor has a protruding portion protruding inwardly to face the recess portion of the workpiece; and
   moving one of the induction heating coil and the workpiece along an axial direction of the workpiece,
wherein the conductor comprises:
a first conductor comprising surrounding portions configured to surround the workpiece around the axis of the workpiece, the surrounding portions being arranged coaxially with a space provided between the surrounding portions and being coupled to each other, and
a second conductor comprising the protruding portion and arranged between the surrounding portions such that electric current flowing in the surrounding portions causes induced electric current to flow in the second conductor,
wherein the second conductor is moveable relative to the first conductor.

* * * * *